United States Patent [19]
Bouillot et al.

[11] Patent Number: 4,751,698
[45] Date of Patent: Jun. 14, 1988

[54] SERIAL LINK ADAPTER FOR A COMMUNICATION CONTROLLER

[75] Inventors: Michel Bouillot, Nice; Jean-Louis Calvignac, La Gaude; Jean-Marie L. Munier, Cagnes sur Mer, all of France

[73] Assignee: International Business Machines Corp., Armonk, N.Y.

[21] Appl. No.: 940,706

[22] Filed: Dec. 11, 1986

[30] Foreign Application Priority Data

Dec. 23, 1985 [EP] European Pat. Off. ........ 85430044.9

[51] Int. Cl.$^4$ .............................................. H04J 3/12
[52] U.S. Cl. ...................................... 370/68; 370/67; 370/110.1
[58] Field of Search ............... 370/68, 68.1, 110.1, 370/66, 58, 85, 67

[56] References Cited

U.S. PATENT DOCUMENTS 4,628,505 12/1986 Paris ................................ 370/110.1

FOREIGN PATENT DOCUMENTS 8505241 11/1985 PCT Int'l Appl. ................ 370/85
8605650 9/1986 PCT Int'l Appl. ................ 370/58

OTHER PUBLICATIONS

E. T. Mackey et al, "Mixing Data and Voice on the T1-Line", Bell Laboratories Record, vol. 53, No. 2, 1975, pp. 136–142.

T. Usukura et al., "Man and Wan", NEC Research and Development, 1985, pp. 134–146.

K. Agusa et al., "Personal Computer Network with Voice Transmission Capability", IEEE Computer Socieyt, Arlington, U.S., 25–29, Sep. 1983, pp. 394–399.

Primary Examiner—Douglas W. Olms
Assistant Examiner—Melvin Marcelo
Attorney, Agent, or Firm—John B. Frisone

[57] ABSTRACT

Serial link adapter to be used in a communication controller comprising data handling means (DHM), said adapter allowing the communication controller to be attached to a multiplex serial link carrying data and non coded information bits in dedicated slots.

In line adapter LA1 receiving means RCV1 are connected to serial link carrying data and non coded information slots. The receiving means comprises a routing arrangement for sending the data slot bits to the data handling means of the controller and the non coded information slot bits a high speed bus HSB1. Transmitting means Xmit1 are connected to high speed bus HSB2 and to the data handling means and comprises means for sending the data and non coded information slot bits in dedicated slots on the serial multiplex link MPX-T. Line adapter LA2 comprises means which are similar to the receiving and transmitting means in adapter LA1 and may be connected to the private branch exchange located in the same site as the communication controller.

8 Claims, 3 Drawing Sheets

SERIAL LINK ADAPTER FOR A COMMUNICATION CONTROLLER

FIELD OF THE INVENTION

This invention relates to a serial link adapter allowing a communication controller which is attached to a Public Switched Network multiplex link carrying data and non coded information NCI to switch the NCI information to a private branch exchange located in the same site.

BACKGROUND ART

The non coded information includes voice, facsimile, video. In the past, the NCI resources such as private branch exchanges and lines were separated from the data resources such as communication controllers and lines, thus taking no advantage from the fact that the private branch exchanges PABX, the communication controllers and the related connection equipment are usually close to each other in the same site.

Since some years, the advent of digital multiplexes has led to integrate different kinds of information on the same high speed link. Specific products exist today, that allow voice and data integration of 64 kilobits per second slots on the same multiplex link.

SUMMARY OF THE INVENTION

An object of the present invention is to provide a serial link adapter to be used in a communication controller allowing the communication controller to switch the non coded information (such as voice) slots between the public switched network multiplex links attached to the communication controller adapters and the multiplex links of the private branch exchange located in the same site.

The serial link adapter to be used in the communication controller comprising data handling means (DHM), allows the communication controller to be attached to a multiplex serial link carrying data and non coded information bits in dedicated slots.

It comprises receiving means connected on the one hand to the serial link for receiving the bit slot contents and on the other hand to the data handling means and to an inter-adapter high speed bus (HSB) connected to at least one other link adapter.

The receiving means comprises storing means which are sequentially addressed and in which a storage location is assigned to each slot of the serial link. In each storage location an indication bit is set to a first value (0) when the corresponding slot contains data or to a second value (1) when the corresponding slot contains non coded information and in the location corresponding to non coded information slots, the number of a corresponding slot assigned on the inter adapter high speed bus is stored. Gating means are responsive to the information read from the storage locations to cause the bit slot contents to be sent to the data handling means or to the high speed bus depending upon the value of the indication bit.

In the adapter, transmitting means comprise receiving means connected to the data handling means and to the inter-adapter high speed bus for receiving the data and non coded information slot bits and routing means connected to the receiving means for providing the data and the non coded information slot bits to the serial link.

DETAILED DESCRIPTION OF THE INVENTION

Figure 1:
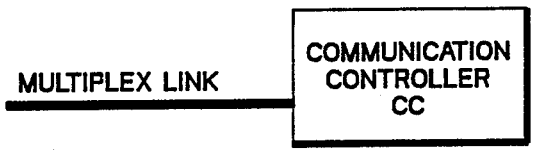
FIG. 1 shows how, in the prior art a communication controller and a private branch exchanger located in the same site are attached to multiplex serial links.

As shown in FIG. 1, at the present time in a same site, the use of multiplex links which may carry data and non coded information slots is not optimized, since the data slots are generally handled by communication controller CC and the non coded information slots for example voice slots are handled by the private branch exchange PBX.

Specific devices exist today that allow voice and data integration. These products comprise means for routing the voice or data slots to the dedicated equipment i.e. communication controller or PBX as the case may be. These devices are provided in separated boxes which have to be added to the communication controlldr so that there is a duplication of resources in the communication controller and in the separated device.

Figure 2:
FIG. 2 shows schematically the arrangement of the communication controller which allows the non coded information slots on the multiplex link to be exchanged with the private branch exchange according to the present invention.
Figure 2:
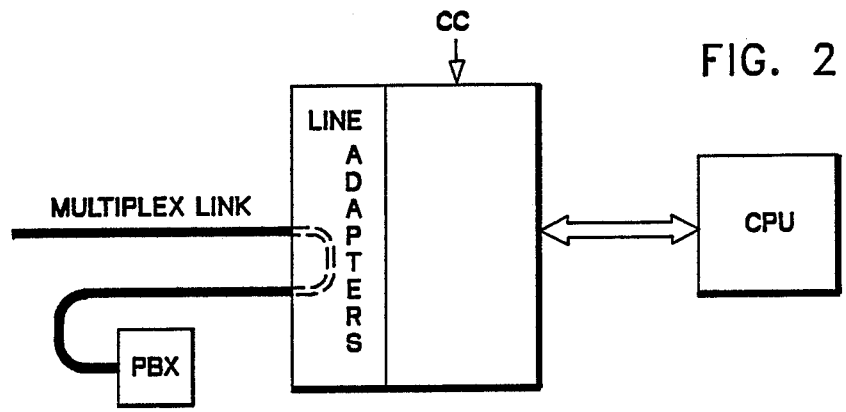

As schematically shown in FIG. 2, communication controller CC comprises a central control unit CCU and a storage unit and is connected to the one hand to communication lines or multiplex links through line adapters. Each line adapter may be connected to a plurality of low speed lines (not shown) operating at less than 9600 bits per second or to multiplex links carrying voice or data in dedicated slots. One such link is shown. The communication controller controls the exchange of information between users connected to the communication lines or links and at least one host processing unit CPU. As schematically shown in the FIG. 2, the line adapters according to the present invention comprises means which allows the NCI (such as voice) slots received or to be transmitted through the multiplex link connected to a Public Switched Network to be sent to or received from a multiplex link connected to the private branch exchange PBX. Thus such slots are not handled by the central processing unit CPU.

Figure 3:
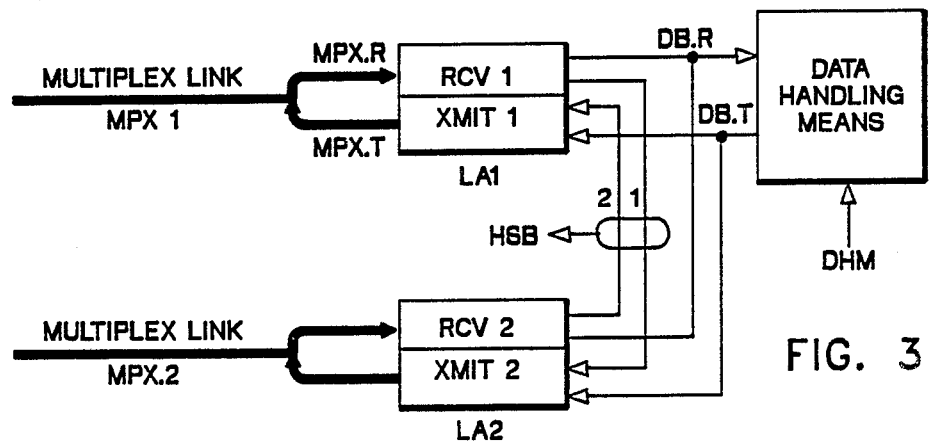
FIG. 3 shows schematically the block diagram of the adapter according to the invention.

As shown in FIG. 3, multiplex link MPX 1 transporting the voice and data slots is attached to line adapter LA1 comprising receiving means RCV1 and transmitting means Xmit1 connected to the receive and transmit interfaces of the multiplex link. The private branch exchange PBX is attached to line adapter LA2 through multiplex link MPX2 comprising a receive and a transmit interface. Line adapter LA2 comprises receiving means RCV2 and transmitting means Xmit2. Receiving means RCV1 is connected to transmitting means Xmit2 through high speed bus HSB1 and receiving means RCV2 is connected to transmitting means Xmit through high speed bus HSB2.

The receiving means and transmitting means in the line adapters LA1 and LA2 are also connected to the data handling means DHM in the communication controller central control unit through data buses DB-R and DB-T.

The receiving and transmitting means RCV and Xmit which are provided in each adapter will now be described in reference to FIGS. 4 and 5. Adapters LA1 and LA2 comprise the same means.

Figure 4:
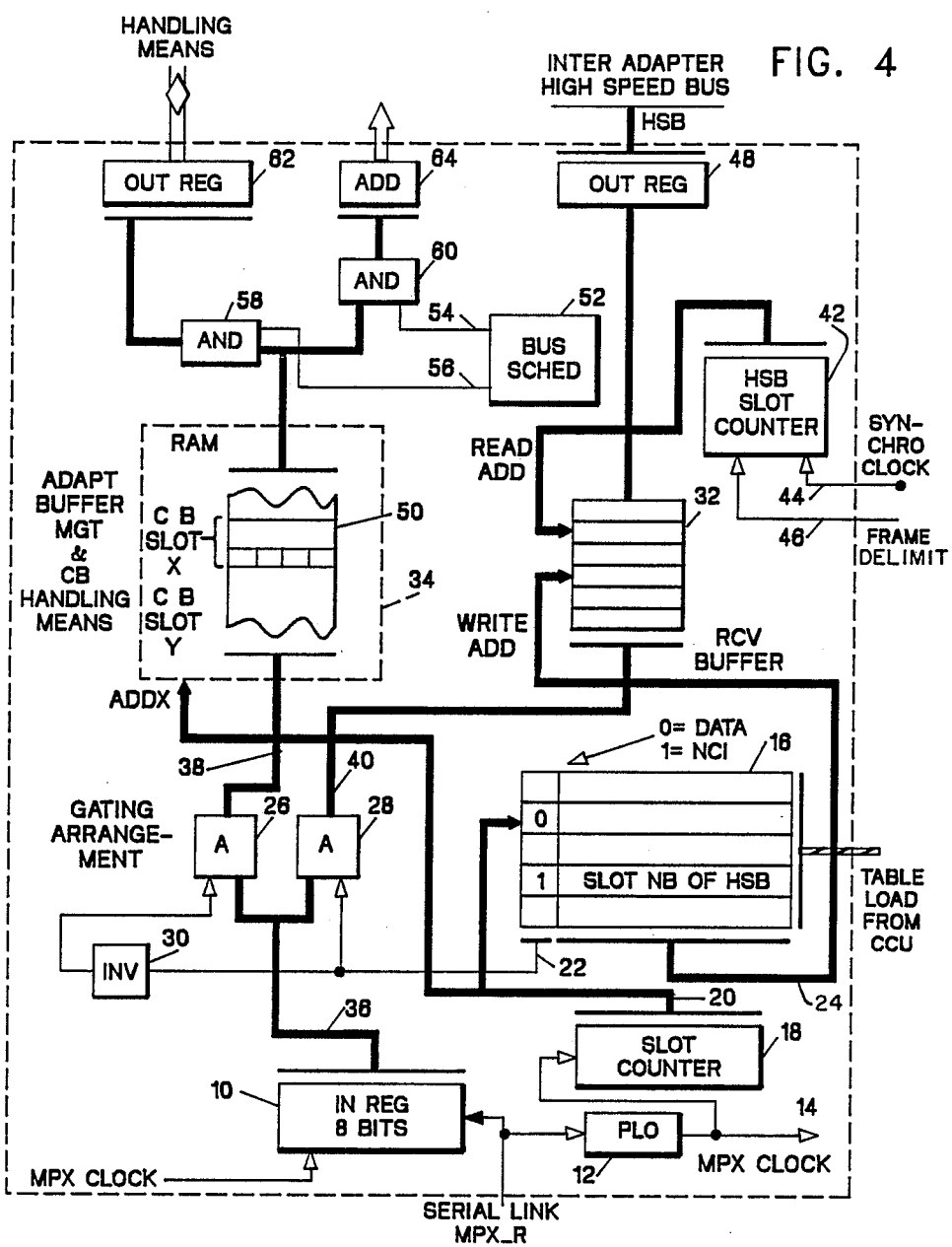
FIG. 4 shows the receiving means RCV of the adapter according to the invention.

The receiving means shown in FIG. 4 comprises a 8-bit input shift register 10 which receives the serial bits from the serial multiplex receive interface link MPX-R. Phase locked oscillator PLO 12 is connected to the multiplex link MPX-R and generates the multiplex clock signal MPX clock at its output 14 from the bit stream on the multiplex link.

Table 16 is loaded at the adapter initialisation from the central control unit CCU using the conventional mechanisms allowing the loading of adapter registers such as described in U.S. Pat. No. 4,504,901.

This table indicates whether each slot of the input multiplex link MPX-R contains data or not coded information such as voice to be sent on the high speed bus HSB. As schematically shown in the drawing, the table contains a storage location assigned to each slot of the frame on the input multiplex link MPX-R. Each location comprises a first bit indicating whether the corresponding slot contains data (first bit set at 0) or non coded information NCI such as voice (first bit set at 1). If the slot contains the slot number assigned to the input slot on the multiplex link MPX-R input slot on the high speed bus HSB.

The PLO output signal on line 14 is provided to slot counter 18 which is reset at the beginning of each frame on the input multiplex link MPX-R and counts the slots in the frame.

The slot counter output signal on bus 20 carries the address information which points on table 16. The content of the addressed location is provided on line 22 and on bus 24, so that the status of line 22 indicates that the slot contains data or non coded information and the information on bus 24 indicates the HSB slot number on the high speed bus HSB corresponding to the slot number on the input multiplex link MPX-R when this slot contains non coded information NCI.

Gating arrangement comprising AND gate assemblies 26 and 28 and inverter 30 allows the content of input register 10 to be sent either to receive buffer 32 or to adapter buffer management and control block handling means 34.

AND gate assembly 28 receives the content of input register 10 on bus 36 and is connected to line 22. In the same way AND gate assembly 26 receives the content of input register 10 and is connected to the output of inverter 30 which inverts the signal on line 22. Thus, depending upon the value of slot counter 18 (which allows to get indication bit from table 16), the content of register 10 is transferred either at the output 38 of AND gate assembly 26 or at the output 40 of AND gate assembly 28.

The HSB slot number indication on line 24 provides the WRITE address of receive buffer 32. Thus when the content of input register 10 is provided to output bus 40, it is written at the address of the receive buffer carried on bus 24.

High speed bus slot counter 42 which is reset at the beginning of each frame on the high speed bus counts the slots on this high speed bus. To do this it receives a synchro clock signal on line 44 and a frame delimiting signal on line 46. Counter 42 provides the READ address of receive buffer 32. The content of the read location of buffer 32 is transferred to output register 48 to be sent on high speed bus HSB.

Adapter buffer and management control block handling means 34 comprises a random access memory RAM in which a control block is assigned to each slot of the frames on the input multiplex link MPX-R. The control block are addressed by the value of slot counter 18 on line 20 so that the content of input register 10 is transferred in the assigned control block when the input slot on the MPX-R link contains data.

The control block in random access memory 50 contains the data slot content and address information of the assigned block in the central control unit storage. Bus scheduler 52 generates gating signals on its outputs 54 and 56 which are provided to AND gate assemblies 58 and 60 so that the data and address content of the control block in RAM 50 are provided in data and address output registers 62 and 64 to be transferred to the central control unit handling means. This part of the receiving means operates in a conventional way and is not described in more details.

Figure 5:
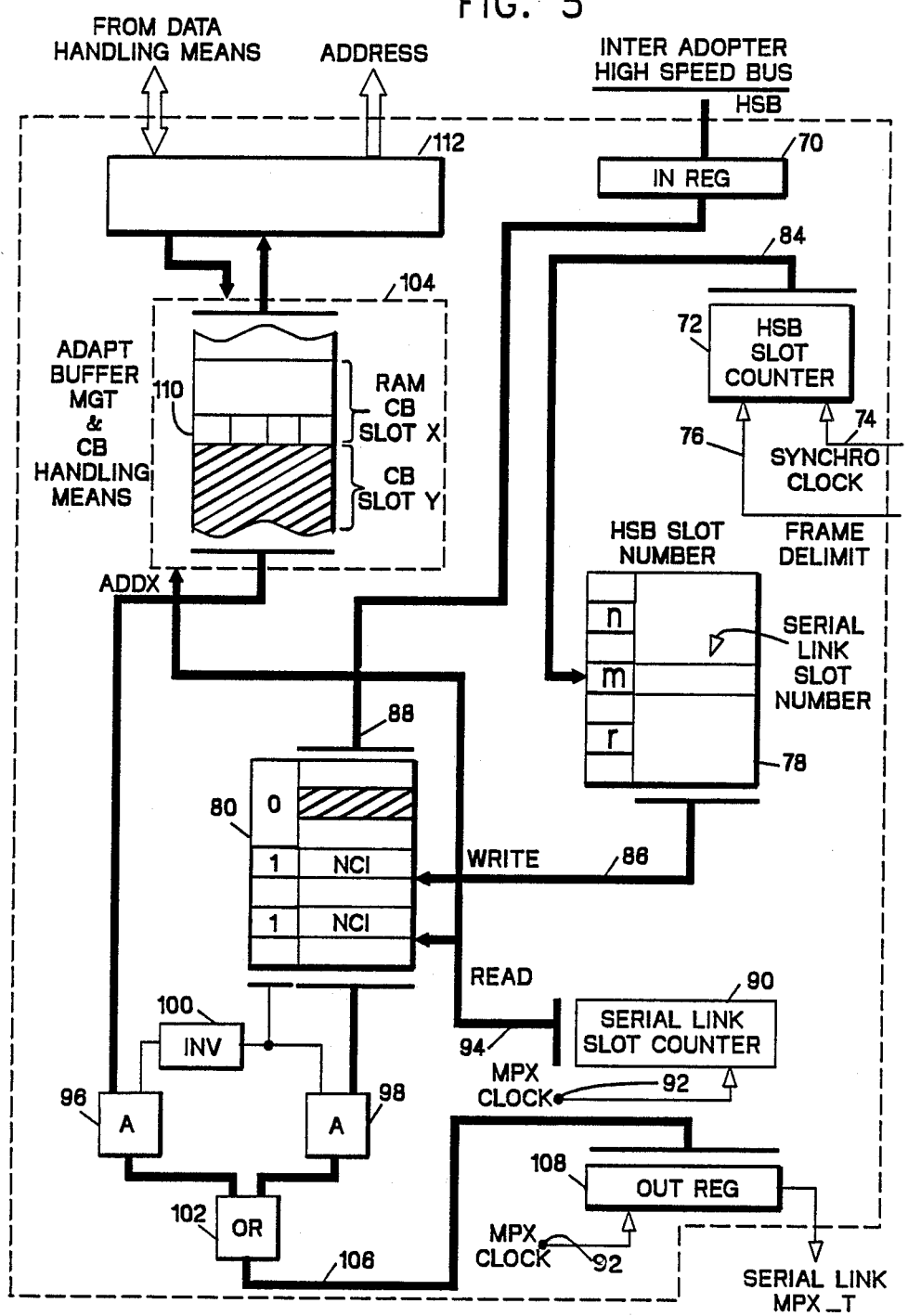
FIG. 5 shows the transmitting means Xmit of the adapter according to the invention.

The transmitting means of the adapters is shown in FIG. 5. The transmitting means comprises input register 70 which assembles the NCI bits on the HSB bus. As in the receiving means an HSB slot counter counts the slot on the HSB bus under control of a synchro clock signal on line 74 and a frame delimiting signal on line 76. The HSB counter may be common to the receiving and transmitting means of a line adapter.

Marking store 78 comprises a table indicating the correspondence between the HSB slot numbers and the serial link MPX slot number. Table 80 has the same configuration as table 16 in the receiving means, i.e. one location in the table is assigned to each slot of the frames on the multiplex link MPX-T and contains a first position which is set at a first value (0) to indicate that the corresponding slot contains data or at a second value (1) to indicate that the corresponding slot contains non coded information such as voice.

The output 84 of HSB slot counter 72 points on marking store 78 which thus provides on its output 86 the number of the serial link MPX slot number corresponding to the HSB slot number. Output bus 86 provides the WRITE address to table 80 in which the content of register 70 is written through bus 88.

Serial link slot counter 90 operating under control of a clock signal at the multiplex link MPX rate on line 92 provides on its output bus 94 the slot number on multiplex link MPX which constitutes the READ address of table 80.

The information which is read from table 80 is provided to a gating arrangement comprising AND gate assemblies 96 and 98, inverter 100 and OR assembly 102.

The NCI/data identification bit in the information read from table 80 is provided to one input of the AND gate assembly 98 and is inverted in inverter 100, the output of which is provided to one input of AND gate assembly 96.

AND gate assembly 98 receives the NCI information read from the table 80 so as to transfer it to one input of OR assembly when the NCI/data identification bit is set to 1.

AND gate assembly 96 receives the data information from adapter and buffer management and control block handling means 104 which are similar to means 34 in the receiving means shown in FIG. 4, so as to transfer the data to the OR assembly when the NCI/data identification bit is set to 0.

The output bus 106 of OR assembly 102 is provided to output register 108 to be provided serially under control of MPX link clock on line 92 on multiplex link MPX-T.

The read address of random access memory 110 in means 104 is provided by counter 90 on bus 94.

The data to be sent in dedicated slots on the output multiplex link MPX-T are provided in the control blocks of the random access memory 110 by the communication controller data handling means through register and gating arrangement 112.

Thanks to this arrangement of receiving and transmitting means, a transparent transfer of NCI information is made through the inter-adapter high speed bus HSB without impact on the data handling resources. Transfer of data slots is performed using the data bus DB to be processed by the data handling means.

The adapter performs the slot insert and drop functions in receive and transmit modes. The channel allocation table is built from commands issued either by an operator or by a dedicated control program that gives the relationship between a slot of the MPX-1 multiplex link attached to the public switched network and a slot of the MPX-2 multiplex link attached to the private branch exchange. This relationship is maintained during the time of each session. No interpretation is made in the communication controller on the voice signalling information.

In receive mode, register 10 assembles the received bits, the slot counter 18 provides the information required to point on table 16. Depending upon the slot content (data or NCI), the gating arrangement 26, 28 causes the register 10 content to be sent to the data handling means through 34 or to receive buffer, the WRITE address of which is provided by table 16. The READ address of the buffer is provided by HSB slot counter 42, and is used to address the receive buffer and send the content of the read location to the high speed bus HSB.

In transmit mode, the data bits to be transmitted from the data handling means are received in the buffer management and control block handling means 104, which thus contains an indication of the slot number. The NCI bits are received from the high speed bus and written in table 80 at the address which is provided by serial link slot counter 90. Gating arrangement 96, 98 allows either the NCI information read from table 80 or the data slot content to be sent on the serial link.

We claim:

1. Serial link adapter to be used in a communication controller comprising data handling means (DHM), said adapter allowing the communication controller to be attached to a multiplex serial link carrying data and non coded information bits in dedicated slots, and being characterized in that it comprises:
    first receiving means connected to the serial link (10, 32, 34) for receiving the bit slot contents and to the data handling means and to an inter-adapter high speed bus (HSB) connected to at least one other link adapter, and comprising:
        first storing means (16) which are sequentially addressed and which comprises a storage location assigned to each slot of the serial link, in which an indication bit is set to a first value (0) when the corresponding slot contains data and to a second value (1) when the corresponding slot contains non coded information and in the location corresponding to non coded information slots, the number of a correspondign slot assigned on the inter adapter high speed bus is stored,
        gating means (26,28) responsive to the information read from the storage locations to cause the bit slot contents to be sent to the data handling means or the high speed bus depending upon the value of the indication bit,
    transmitting means (104, 70) comprising:
        second receiving means connected to the data handling means and to the inter-adapter high speed bus for receiving the data and non coded information slot bits,
        routing means (72, 80, 78, 90, 96, 98, 108) connected to the second receiving means for providing the data and the non coded information slot bits to the serial link.

2. Adapter according to claim 1 characterized in that the routing means in the transmitting means comprises:
    a second storing means (78) in which is stored a table indicating the correspondence between the slot numbers on the inter-adapter high speed bus and the serial link said table including for each slot on the serial link an indication bit,
    a third storing means (80) which comprises one location per slot on the serial link in which an indication bit is set at a first value when the corresponding slot is a data slot and at a second value when the corresponding slot is a non coded information slot,
    first addressing means (72) which causes the second storing means (78) to be sequentially addressed and read to get the indication bit and the serial link slot number which constitutes the write address of the third storing means at which the non coded received information bits are written,
    second addressing means (90) which causes the third storing means to be sequentially read,
    a gating arrangement (96,98) responsive to the indication bit read from the third storing means to send either the data bits from the data handling means or the non coded information bits stored in the third storing means to the serial link.

3. Adapter according to claim 2 characterized in that the first addressing means comprises a slot counter (72) which receives a synchro clock signal at the high speed bus clock rate and a frame delimiting signal which thus counts the slot on the high speed bus and provides on its output bus (84) the address value of the second storing means (78).

4. Adapter according to claim 3 characterized in that the second addressing means comprises a slot counter (90) which counts modulo n at the serial link clock rate, where n is the number of slots per frame on the serial link and which provides on its output bus (94) the read address of the third storing means (80).

5. Adapter according to any one of claims 1 to 4 characterized in that the first receiving means comprises a serial link slot counter (18) which counts modulo n, where n is the number of slots per frame on the serial link, and which provides on its output bus the address which is used for sequentially addressing the first storing means (16).

6. Adapter according to any one of claims 1 to 4 characterized in that the first receiving means comprise a receive buffering means (32) in which the non coded information at the output of the gating arrangement is written at an address the value of which is equal to the value read from the first storing means (16).

7. Adapter according to claim 6, characterized in that the first receiving means comprise a high speed bus slot counter (42) which is responsive to a frame delimiting signal and to a signal at the high speed bus clock rate and which provides on its output bus the read address of the receive buffering means (32) which is provided to the receive buffering means in such a way that the information read from the receive buffering means is provided to the high speed bus.

8. Adapter according to claim 7, characterized in that the first receiving means comprises an output register (48) which receives the information read from the receive buffering means (32) and which is connected to the high speed bus in order to transfer the non coded information bits to said high speed bus.

* * * * *